(12) United States Patent
Russell (10) Patent No.: US 7,800,485 B2
(45) Date of Patent: Sep. 21, 2010

(54) BICYCLE TURN SIGNALS

(76) Inventor: Darren G. Russell, 55 Hale Noho Way, Kihei, HI (US) 96753

( * ) Notice: Subject to any disclaimer, the term of this patent is extended or adjusted under 35 U.S.C. 154(b) by 246 days.

(21) Appl. No.: 11/875,331

(22) Filed: Oct. 19, 2007

(65) Prior Publication Data

US 2009/0102627 A1    Apr. 23, 2009

(51) Int. Cl.
*B62J 3/00*    (2006.01)

(52) U.S. Cl. .................. 340/432; 340/463; 340/465; 340/468; 340/475; 362/473

(58) Field of Classification Search ............... 340/432, 340/472, 463, 464, 465, 468, 475, 478; 362/287, 362/396, 418, 473
See application file for complete search history.

(56) References Cited

U.S. PATENT DOCUMENTS

| | | | | |
|---|---|---|---|---|
| 4,760,372 A | * | 7/1988 | Watson | 340/432 |
| 4,843,368 A | * | 6/1989 | Poulos | 340/464 |
| 5,617,303 A | * | 4/1997 | Izzo, Sr. | 362/473 |
| 6,690,266 B1 | * | 2/2004 | Jack et al. | 340/432 |
| 2004/0189722 A1 | * | 9/2004 | Acres | 345/866 |
| 2005/0024884 A1 | * | 2/2005 | Seminara et al. | 362/473 |
| 2007/0063831 A1 | * | 3/2007 | Perkins et al. | 340/479 |

* cited by examiner

*Primary Examiner*—Hung T. Nguyen (57) ABSTRACT

Embodiments of the invention include methods and apparatuses relating to bicycle turn signals. In one embodiment, a bicycle turn signal apparatus includes left and right switches, left and right turn lights, a controller, and a power supply.

3 Claims, 8 Drawing Sheets

BICYCLE TURN SIGNALS

BACKGROUND

1. Technical Field

The subject matter disclosed herein generally relates to electrical components for bicycles. More specifically, the subject matter relates to bicycle turn signal components.

2. Information

Bicycle riding is a mode of transportation and source of enjoyment for many people around the world. In many environments, particularly in urban areas, it may be important for bicycle riders to communicate to others on the road when the rider plans to turn or change lanes. Currently, hand signals may be used to indicate a turn or lane change. However, others on the road may have a difficult time seeing the hand signals, especially at night. Further, many riders ride with backpacks, bags, or other items and for them hand signaling may be cumbersome.

BRIEF DESCRIPTION OF THE DRAWINGS

Embodiments are illustrated by way of example and not by way of limitation in the figures of the accompanying drawings, in which like references may indicate similar elements and in which.

DETAILED DESCRIPTION

In the following description, various embodiments will be disclosed. However, it will be apparent to those skilled in the art that the embodiments may be practiced with all or only some of the disclosed subject matter. For purposes of explanation, specific numbers and/or configurations are set forth in order to provide a thorough understanding of the embodiments. However, it will also be apparent to one skilled in the art that the embodiments may be practiced without one or more of the specific details, or with other approaches and/or components. In other instances, well-known structures and/or operations are not shown or described in detail to avoid obscuring the embodiments. Furthermore, it is understood that the embodiments shown in the figures are illustrative representations and are not necessarily drawn to scale.

References throughout this specification to "one embodiment" or "an embodiment" mean that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In various embodiments of the claimed subject matter, apparatuses for improved bicycle turn signaling are described. In an embodiment, left and right turn switches may be mounted at or near the handles of a bicycle. The switches may be coupled to a controller, such as a microcontroller, which monitors the switches. The controller may be coupled to left and right turn lights. Upon activation by the rider of the right turn switch (for example) the controller may activate the right turn light by sending an activate light signal. The activate light signal may be sent until the rider deactivates the switch, whereupon the controller may stop the activate light signal. In various examples, light emitting diodes may be used in the turn lights which may offer the advantages of brighter turn lights with less power usage.

In another embodiment, a timer may be coupled to the controller, and upon activation of the turn switch, the controller may send a timer start signal to the timer. The timer may then count-down a preset amount of time (for example five seconds) and upon completion of the count-down may send a timer end signal to the controller. Upon receiving the timer end signal, the controller may stop the activate light signal. Such a configuration may offer the advantage of allowing the rider to press a switch to signal a turn and then complete the turn and maneuvering without needing to press a switch to deactivate the turn light.

In another embodiment, an accelerometer may be coupled to a controller. The accelerometer may monitor the tilt of the bicycle and may provide a left tilt signal to the controller (for example) upon the rider leaning into a turn, lane change, or other maneuver. Upon receiving the left tilt signal, the controller may send an activate light signal to the left turn signal and a timer start signal to a timer coupled to the controller. The timer may count-down a preset amount of time and upon completion of the count-down may send a timer end signal to the controller. The controller may thereupon stop the activate light signal. Such an apparatus may offer the advantage of a completely hands free turn signal so the rider may concentrate more completely on the operation of the bicycle, particularly in dense urban areas.

Figure 1:
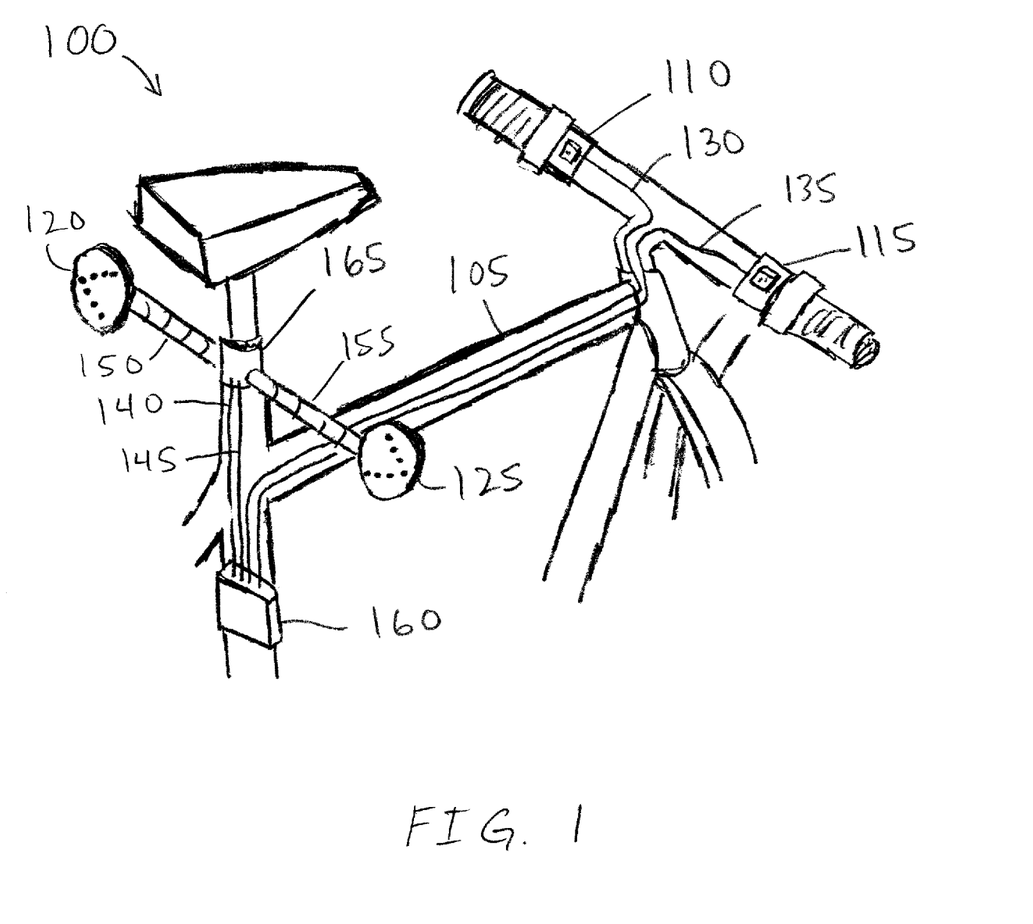
FIG. 1 illustrates a bicycle turn signal apparatus in accordance with one embodiment of the present invention.

Turning now to FIGS. 1-8, various embodiments will be described. As illustrated in FIG. 1, a turn signal apparatus 100 may be mounted to a bicycle 105. Bicycle 105 may be any type of bicycle, such as, but not limited a road bike, mountain bike, hybrid, touring bike, children's bike, or tandem bike. As shown, turn signal apparatus 100 may include a left turn switch 110, a right turn switch 115, a left turn light 120, a right turn light 125, connectors 130, 135, 140, 145, flexible arms 150, 155, and a housing 160. Left turn switch 110 and right turn switch 115 may be any type of switch, such as, but not limited to trigger switches, toggle switches, push button switches, or the like.

As shown, left turn switch 110 and right turn switch 115 may be mounted on the handle bar and near the handles of bicycle 105 in order to facilitate easy switching by the rider. The turn switches may be mounted by any suitable means such as hard plastic mounting brackets or elastic strappings. In other examples, the switches may be located within or under the handles such that the switches are activated by the rider firmly squeezing the handles. Such a configuration may limit the movement required by the rider and therefore increase rider safety.

Figure 3:
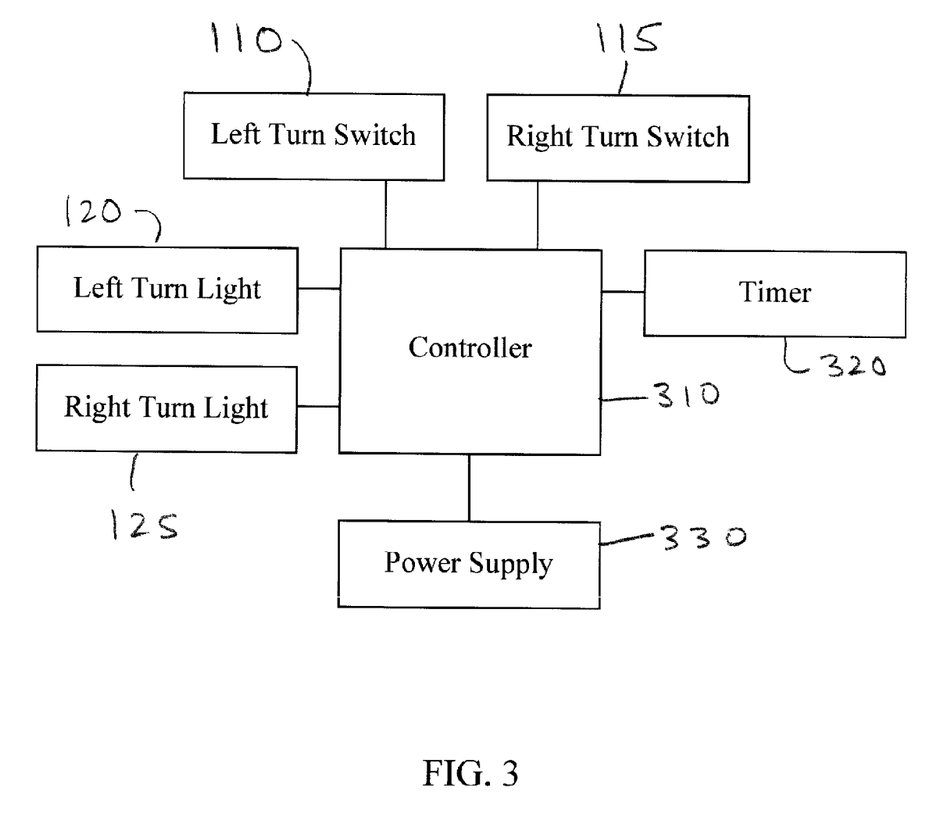
FIG. 3 illustrates a block diagram of a bicycle turn signal apparatus in accordance with one embodiment of the present invention.

Left turn switch 110 and right turn switch 115 may be coupled via connectors 130, 135 to components within housing 160, and left turn light 120 and right turn light 125 may be coupled via connectors 140, 145 to components within housing 160, as is illustrated in FIG. 3. With reference to FIG. 3, left turn switch 110, right turn switch 115, left turn light 120, and right turn light 125 may be coupled to a controller 310. Controller 310 may include any electronic device capable of controlling the components connected to it, such as, but not limited to a microcontroller or a microprocessor. Connectors 130, 135, 140, 145 may include any coupling device such that signals may be sent between the components. For example, conductive wires may be used. Connectors 130, 135, 140, 145 may be secured to bicycle 105 using tie-wraps, elastic bands, or other means for securement. The connectors extending to the turn lights may extend through flexible arms 150, 155. Although illustrated within housing 160, the described components may be separately secured to bicycle 105 or they may be in any combination of separate housings.

Left turn light 120 and right turn light 125 may be mounted via flexible arms 150, 155 to a clamp 165 which may be removably coupled to bicycle 105. Flexible arms 150, 155 may be any suitable material or construction that may allow the lights to be extended outward or collapsed inward by the rider. In various examples, they may include flexible plastics, braided metals, or the like. Clamp 165 may be secured to any portion of the bicycle such that turn signals 120, 125 may be visible. In one example clamp 165 may be secured to the seat post of bicycle 105. As shown, the turn signals may be mounted together via a shared clamp. In other examples, the turn signals may be separately mounted to bicycle 105.

As illustrated, in some examples each of the components of turn signal apparatus 100 may be mounted to a bicycle, with various components mounted to the handlebars, seat post, and frame. As will be appreciated, the components may be mounted to the bicycle in a variety of configurations. Also, in other examples, a trailer or other component may be hitched to the bicycle. In various example, cargo trailers, child trailers, child seats, and the like may be secured to the bicycle and various components, such as the turn lights and wiring, of turn signal apparatus 100 may be secured to the trailer or component. In one example, the turn lights may be secured to the trailer or component so they may be easily viewed from behind the bicycle, the housing may be mounted to either the bicycle or the trailer and the connectors may be routed using the bicycle frame and the hitch securement of the trailer.

Figure 2:
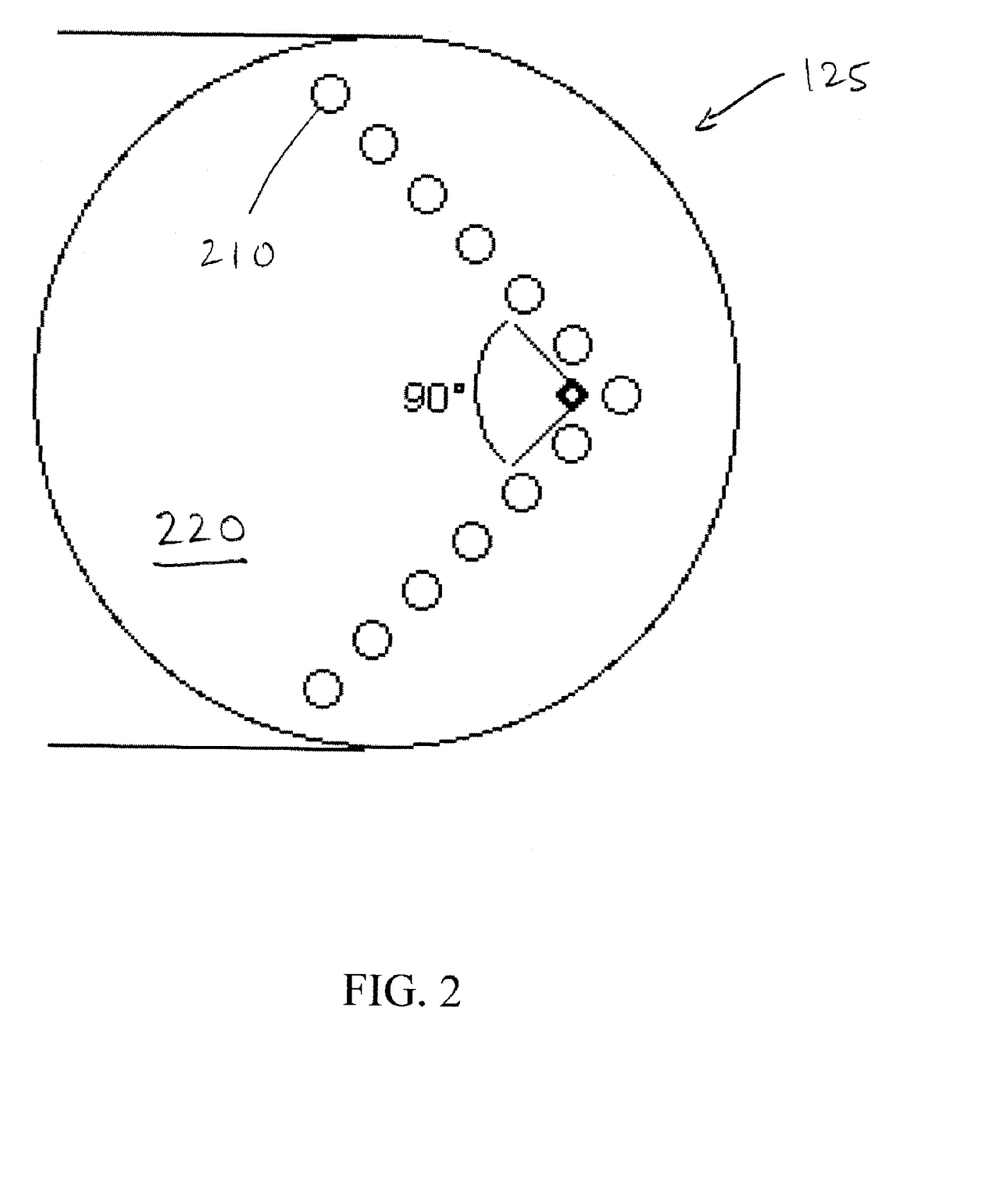
FIG. 2 illustrates a turn signal light in accordance with one embodiment of the present invention.

As shown in FIG. 2, in some examples the turn signals may include multiple light emitting diodes 210 mounted on a reflective backing 220. Any number of light emitting diodes may be used. In various examples five or more light emitting diodes may be used. Further, light emitting diodes 210 may be configured in any manner. In one example they may be configured in the form of the head of an arrow as shown in FIG. 2. Such a configuration may indicate to persons behind the rider that a directional move is about to be made by the rider. As in the illustrated example, thirteen light emitting diodes in the shape of the head of an arrow (with the diodes extending apart at an angle of about 90 degrees) may be used. In other examples, light bulbs or other light sources may be used. A lens cover may be placed over the light source and secured to reflective backing 220 to protect the light source from moisture and dirt.

Figure 4:
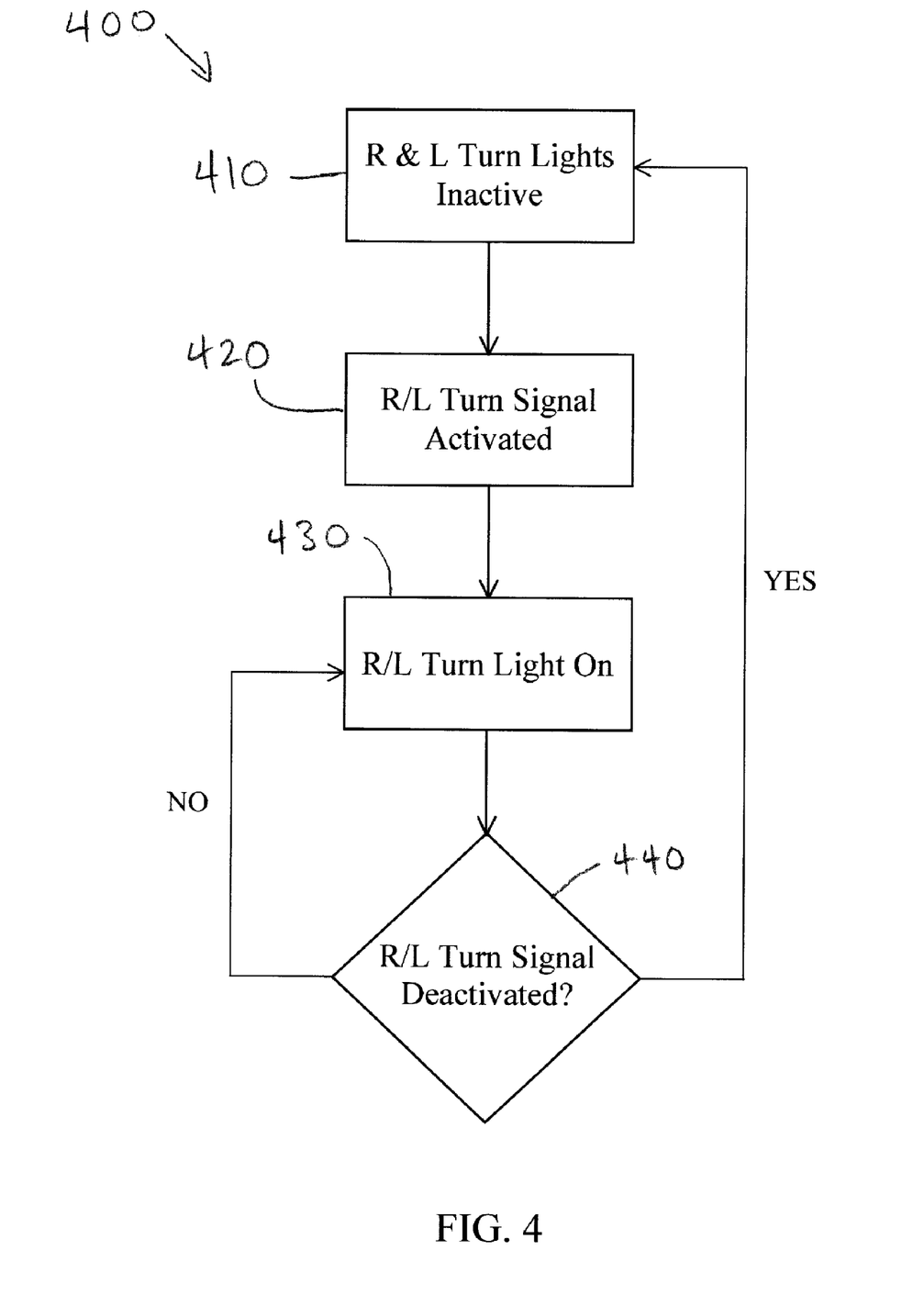
FIG. 4 illustrates a bicycle turn signal operational flow chart in accordance with one embodiment of the present invention.

With reference now to FIG. 3 and FIG. 4, the operation of one embodiment will be described. As shown in FIG. 3, left turn switch 110, right turn switch 115, left turn light 120, and right turn light 125 may be coupled to controller 310. A power supply 330 may also be coupled to controller 310. It will be appreciated that power supply 330 may be also be coupled to provide direct power to any of the individual components. Power supply 330 may be any suitable power supply, such as, but not limited to, a battery pack, a dynamo or a pedal powered generator. As shown, in some examples a timer 320 may be coupled to controller 310. Timer 320 may include any electronic device capable of running a count-down function and providing a completion signal to the controller. In FIG. 4, a flow chart 400 illustrates the operation of a turn signal apparatus without the use of timer 320.

As illustrated in FIG. 4 at block 410, the right and left turn lights may be off or inactive. The turn lights may remain inactive until a right or left turn switch is activated by the rider at block 420. Upon the rider activating a turn switch, controller 310 may sense the switch activation and provide an activate light signal to the appropriate turn light, and in response to the activate light signal, the right or left turn light may be illuminated either in a solid illumination or in a blinking fashion (the blinking light may be at any rate and may include various patterns) as illustrated at block 430. The turn light may remain on until the user deactivates the switch. For example, controller 310 may monitor the appropriate switch at block 440 and if the switch is deactivated, may turn the appropriate light off by no longer providing the light activate signal, which may return the apparatus to a state as shown in block 410, where the turn lights may be inactive until the rider again activates the switch. In such an example, it may be appropriate for the switches to be toggle switches such that there is visual and/or feel feedback to the rider that the switch is on or off. For example a switch flipped forward may be on, while a switch flipped in the back position may be off. Such a configuration may aid the rider in remembering to turn the signal light off after the rider has completed a turn or lane change.

Figure 5:
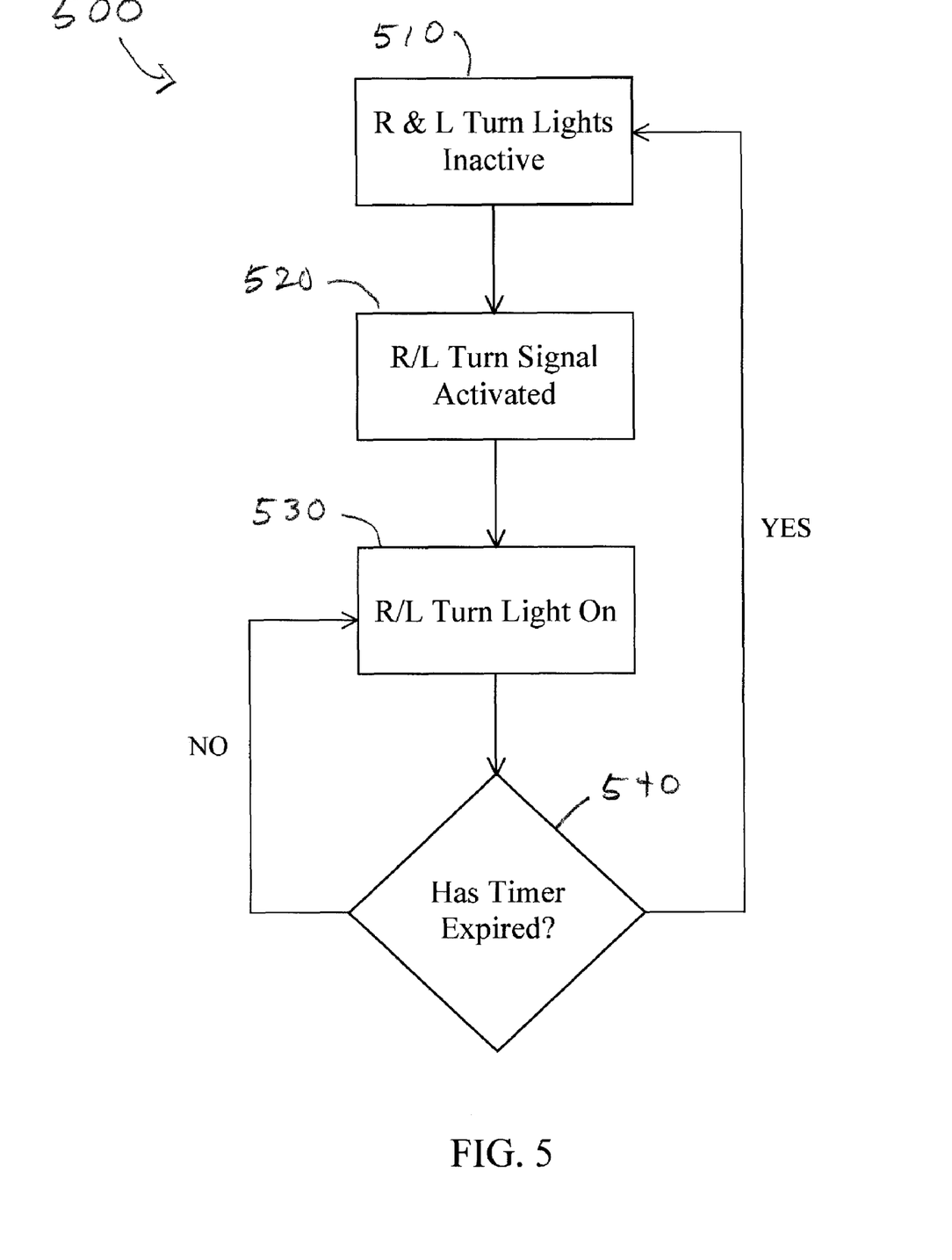
FIG. 5 illustrates a bicycle turn signal operational flow chart in accordance with one embodiment of the present invention.

In another embodiment, timer 320 may be used so that a rider may only need to turn the switch on and may not need to manually turn the switch off after completing the bicycle maneuver. As shown in FIG. 3 and as mentioned previously, a timer 320 may be coupled to controller 310. In FIG. 5, a flow chart 500 illustrating the operation of such an embodiment is illustrated. At block 510, both the right and left turn lights may be inactive. The turn lights may remain inactive until the controller senses a turn switch has been activated by the user at block 520. Upon activation by the user of a turn switch, controller 310 may send an activate light signal to the appropriate turn light and a start timer signal to timer 320. Upon receiving the start timer signal, timer 320 may begin a count-down timer that has been preset with a count-down time, such as, for example, five seconds. So long as the timer has not expired (at block 540), the controller may continue to send an activate light signal to the appropriate turn light. When the count-down timer has expired, timer 320 may send a timer end signal to the controller, and reset the count-down timer. In response to the timer end signal, the controller may stop sending the activate light signal and the turn lights may again be inactive, as shown at block 510. In such an apparatus it may be appropriate for the switch to be a pushbutton switch such that the rider depresses a switch from a neutral position to a depressed position to activate the light and the switch immediately returns to the neutral position (as the rider assumes the timer will turn off the turn light) so that the rider may later again depress the switch to activate the light.

In examples where the timer and turn switches are used, a manual override may be configured. For example, if the switch is depressed during the count-down (for a second time by the rider), the controller may immediately end the activate light signal and reset the timer.

Figure 6:
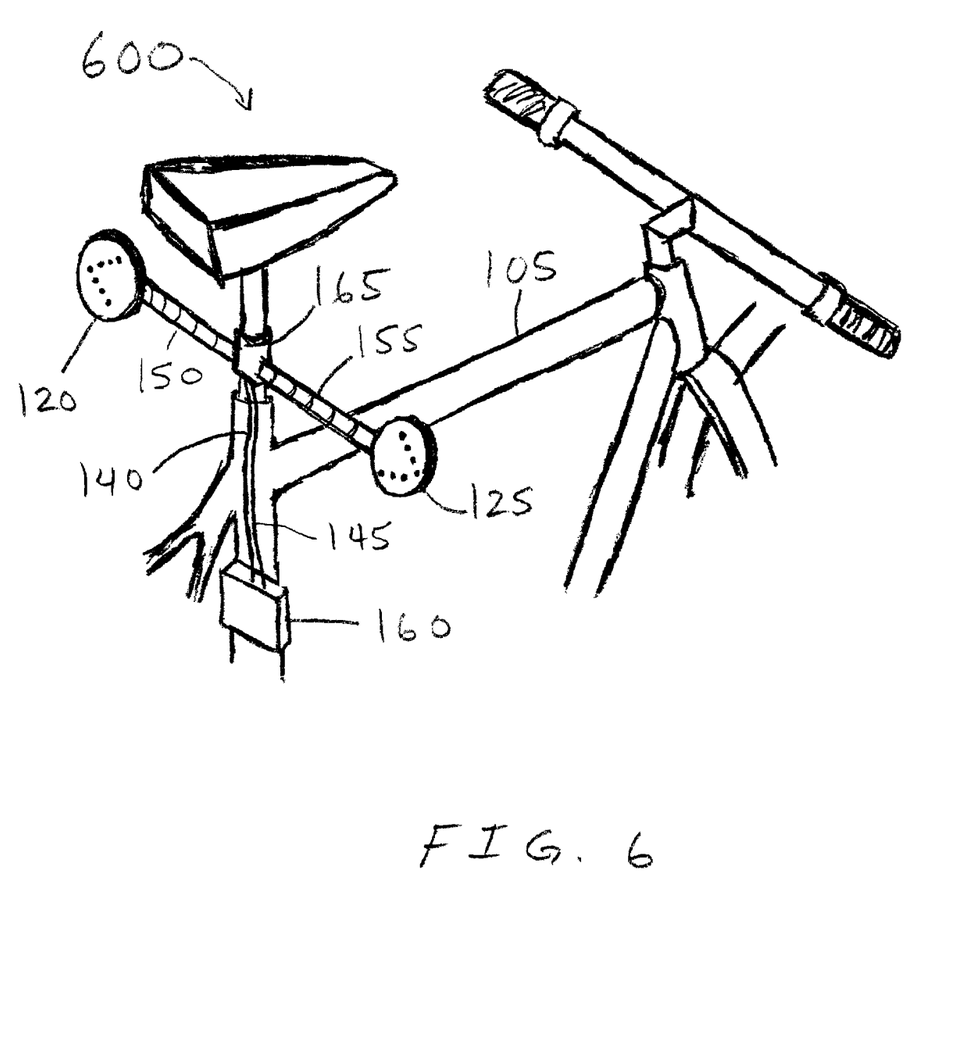
FIG. 6 illustrates a bicycle turn signal apparatus in accordance with one embodiment of the present invention.
Figure 7:
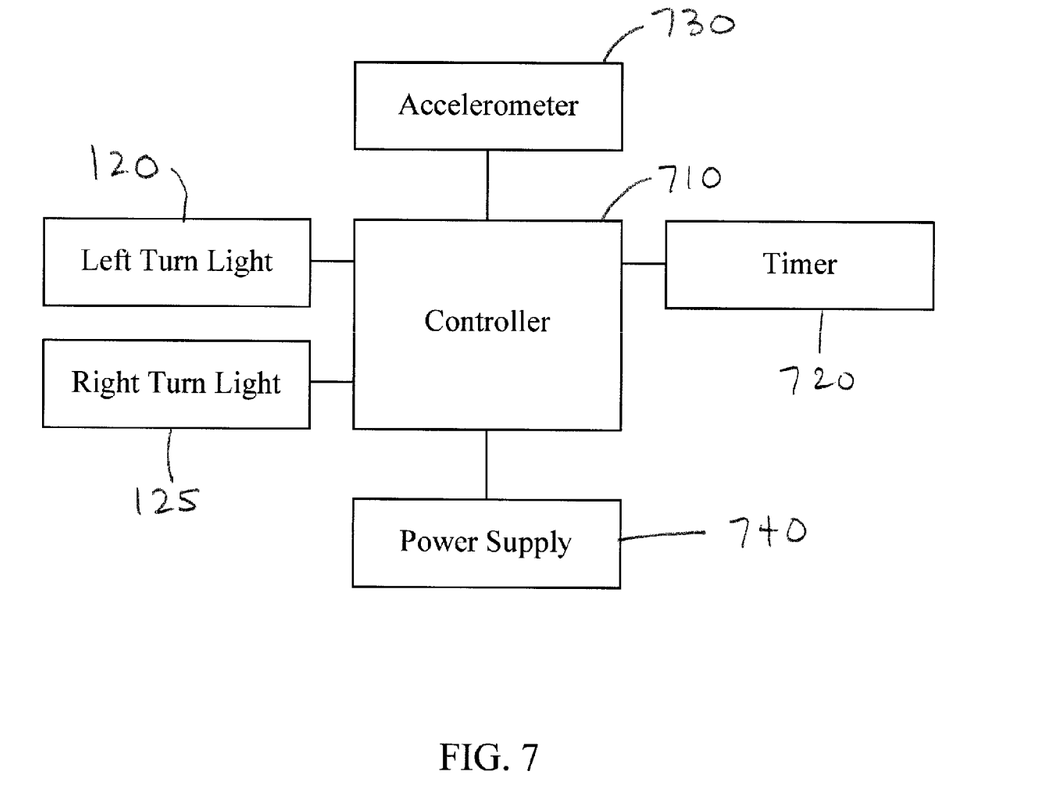
FIG. 7 illustrates a block diagram of a bicycle turn signal apparatus in accordance with one embodiment of the present invention.
Figure 8:
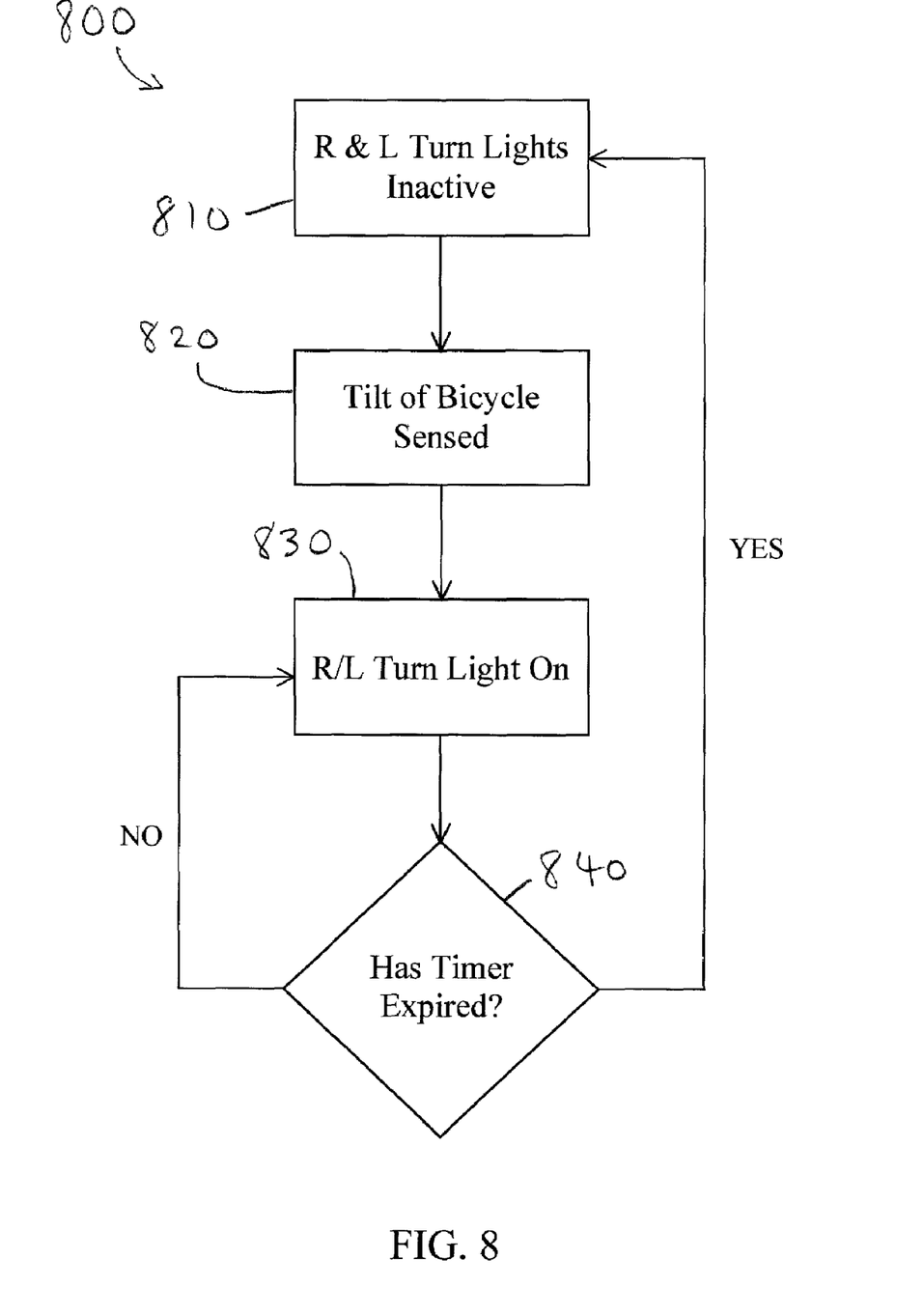
FIG. 8 illustrates a bicycle turn signal operational flow chart in accordance with one embodiment of the present invention.

Turning now to FIGS. 6-8, another embodiment is illustrated. As shown in FIG. 6, turn signal apparatus 600 may be removably secured to bicycle 105 in a manner similar to that described above. Turn signal apparatus 600 may include left turn light 120 and right turn light 125 mounted to flexible arms 150, 155 and clamp 165 which is removably coupled to bicycle 105. Further, couplings 140, 145 may extend from housing 160 to turn lights 120, 125. As shown, turn signal apparatus 600 may exclude manually operated switches.

As shown in FIG. 7, a controller 710 may be coupled to left turn light 120, right turn light 125, an accelerometer 730, a timer 720, and a power supply 740. Accelerometer 730 may be any suitable type of accelerometer for detecting the tilt of bicycle 105, such as, but not limited to piezoelectric, potentiometric, reluctive, servo, peizo resistive, or capacitive. Controller 710 may include any electronic device capable of controlling the components connected to it, such as, but not limited to a microcontroller or a microprocessor. Timer 720 may include any electronic device capable of running a count-down function and providing a completion signal to the controller. Power supply 740 may also include any suitable power supply, such as, but not limited to, a battery pack, a dynamo, or a pedal powered generator. As discussed above with reference to FIG. 1, the components may be attached to the bicycle or bicycle and trailer in a variety of configurations.

In FIG. 8, a flow chart 800 illustrates an embodiment of the operation of a turn signal apparatus using an accelerometer and timer. At block 810, both turn lights may be inactive. In the event that a tilt of the bicycle is detected by accelerometer 730 (at block 820), accelerometer 730 may provide a tilt signal (either left or right) to controller 710. In response to the tilt signal, controller 710 may provide an activate light signal to the appropriate turn light, and controller 710 may provide a start timer signal to timer 720. In response to the activate light signal, the appropriate turn signal may be illuminated at block 830, either in a solid illumination or in a blinking fashion (the blinking light may be at any rate and may include various patterns). In response to the start time signal, timer 720 may start a count-down timer. So long as the timer has not expired at block 840, the controller continues to provide the activate light signal. Once the count-down timer has expired, timer 720 sends a timer end signal to controller 710. In response to the timer end signal, controller 710 may terminate the activate light signal and the turn lights may be inactive as in block 810.

Use of an accelerometer and timer may offer the advantages of providing the rider with turn signals without the rider needing to operate hands switches. Therefore the rider may be able to better concentrate on their surroundings which may offer the advantage of increased safety.

While there has been illustrated and/or described what are presently considered to be example embodiments of claimed subject matter, it will be understood by those skilled in the art that various other modifications may be made, and/or equivalents may be substituted, without departing from the true scope of claimed subject matter. Additionally, many modifications may be made to adapt a particular situation to the teachings of claimed subject matter without departing from subject matter that is claimed. Therefore, it is intended that the patent not be limited to the particular embodiments disclosed, but that it covers all embodiments falling within the scope of the appended claims.

What is claimed is:

1. A turn signal apparatus for a bicycle comprising:
   an accelerometer coupled to a controller and configured to provide a tilt signal to the controller;
   a timer coupled to the controller;
   a left turn light coupled to the controller and configured to be removably mounted to the bicycle;
   a right turn light coupled to the controller and configured to be removably mounted to the bicycle; and
   a power supply coupled to the controller, wherein the controller is configured to provide an activate light signal to the right turn light upon the tilt signal indicating a right tilt of the bicycle, wherein the controller is configured to provide a timer start signal to the timer upon the tilt signal indicating the right tilt of the bicycle, wherein the timer is configured to start a count-down timer upon receiving the timer start signal and upon ending the count-down timer to provide a timer end signal to the controller, and wherein upon receiving the timer end signal the controller is configured to stop the activate light signal.

2. The turn signal apparatus of claim 1, wherein the power supply comprises a pedal powered generator.

3. The turn signal apparatus of claim 1, wherein the power supply comprises a battery pack.

* * * * *